(12) United States Patent
Hamel et al.

(10) Patent No.: US 9,499,738 B2
(45) Date of Patent: Nov. 22, 2016

(54) SOLID ORGANIC SCINTILLATOR DOPED BY ONE OR MORE CHEMICAL ELEMENTS

(75) Inventors: Matthieu Hamel, Cherbourg Octeville (FR); Stephane Darbon, Paris (FR); Stephane Normand, Mantes la Jolie (FR); Gregory Turk, La Tronche (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 712 days.

(21) Appl. No.: 13/992,977

(22) PCT Filed: Dec. 20, 2011

(86) PCT No.: PCT/EP2011/073482
§ 371 (c)(1),
(2), (4) Date: Jul. 18, 2013

(87) PCT Pub. No.: WO2012/085004
PCT Pub. Date: Jun. 28, 2012

(65) Prior Publication Data
US 2013/0299742 A1    Nov. 14, 2013

(30) Foreign Application Priority Data
Dec. 21, 2010   (FR) ..................... 10 60977

(51) Int. Cl.
C09K 11/06    (2006.01)
G21K 4/00    (2006.01)

(52) U.S. Cl.
CPC .............. *C09K 11/06* (2013.01); *G21K 4/00* (2013.01); *C09K 2211/1007* (2013.01); *C09K 2211/1029* (2013.01); *C09K 2211/1033* (2013.01); *C09K 2211/1044* (2013.01)

(58) Field of Classification Search
CPC ............. C09K 11/06; C09K 2211/18; C09K 2211/181–2211/188; C09K 2211/1466; C09K 2211/1475; C09K 2211/1029; C09K 2211/1033; G01T 1/203; G01T 1/2023
See application file for complete search history.

(56) References Cited

U.S. PATENT DOCUMENTS

| | | | | |
|---|---|---|---|---|
| 3,041,287 A | * | 6/1962 | Hyman, Jr | .............. G01T 1/203 |
| | | | | 252/301.18 |
| 3,356,616 A | * | 12/1967 | Sandler | ................... G01T 1/203 |
| | | | | 250/483.1 |
| 6,544,442 B1 | | 4/2003 | Bell et al. | |
| 2010/0314556 A1 | | 12/2010 | Hamel et al. | |

FOREIGN PATENT DOCUMENTS

| | | |
|---|---|---|
| DE | 19521500 A1 | 6/1996 |
| EP | 0913448 A1 | 5/1999 |
| GB | 1264045 A | 2/1972 |
| RU | 1464706 * | 12/1992 |
| WO | 2004017095 A2 | 2/2004 |
| WO | 2009095376 A1 | 8/2009 |

OTHER PUBLICATIONS

Cho, Z., et al., "Tin and Lead Loaded Plastic Scintillators for Low Energy Gamma Ray Detection With Particular Application to High Rate Detection", "IEEE Transactions on Nuclear Science", Feb. 1975, pp. 72-80, vol. NS-22.

* cited by examiner

*Primary Examiner* — Carol M Koslow
(74) *Attorney, Agent, or Firm* — Hultquist, PLLC; Mary B. Grant (57) ABSTRACT

The invention relates to a solid organic scintillator comprising a polymeric matrix in which there are dispersed one or more fluorophore compounds and one or more chemical elements having an atomic number ranging from 40 to 83, characterized in that said scintillator has a weight content of said chemical elements of at least 5% by weight relative to the total weight of the scintillator, and in that the scintillator emits an emission spectrum comprising an emission peak at a wavelength of at least 550 nm.

19 Claims, 3 Drawing Sheets

SOLID ORGANIC SCINTILLATOR DOPED BY ONE OR MORE CHEMICAL ELEMENTS

CROSS-REFERENCE TO RELATED APPLICATIONS

This application is a U.S. national phase under the provisions of 35 U.S.C. §371 of International Patent Application No. PCT/EP11/73482 filed Dec. 20, 2011, which in turn claims priority of French Patent Application No. 1060977 filed Dec. 21, 2010. The disclosures of such international patent application and French priority patent application are hereby incorporated herein by reference in their respective entireties, for all purposes.

TECHNICAL FIELD

The present invention pertains to solid organic scintillators doped by one or more chemical elements comprising a specific polymeric matrix in which fluorophore compounds are dispersed, these scintillators having the combination of following characteristics:
- possible high doping level of chemical element(s);
- capability of emitting at long wavelengths (in particular at wavelengths of at least 550 nm); and
- optionally, a short scintillation decay time.

The invention finds particular application in:
- the medical field, more particularly medical imaging using X-rays;
- the field of experimental physics, and more particularly the design of X-ray diagnostic imaging for Megajoule Laser plasma experiments.

STATE OF THE PRIOR ART

Conventionally a scintillator is intended for the detection of radiation or of high energy particles, which requires the use of material capable of using radiation-matter interaction to convert the energy of ionizing radiation derived from the particles to be detected (this ionizing radiation possibly being X-rays, γ rays for example whose energies range from a few keV to several MeV) into visible or near UV light. The emitted light is then analysed by a photodetector optionally coupled with the scintillator (this photodetector possibly being a photomultiplier, a photodiode, a photographic film or CCD camera).

To be efficient, a scintillator must preferably meet the following characteristics:
- it must have good absorption efficacy of ionizing radiation;
- it must be able, for a given incident particle, to generate sufficient light so that it can be collected;
- it must be transparent to its own light to avoid losses;
- the light must be emitted sufficiently rapidly after passing of the particle, which in other words means that the scintillator must have a short scintillation decay time, in particular for X-ray imaging applications in a hostile radiating environment.

Regarding radiation absorption capacity, this is related to the interaction mode between the matter and the rays, this interaction mode possibly being a photoelectric effect, Compton scattering effect and a pair production effect. Regarding X-rays, the absorption of these rays is related to the effective atomic number $Z_{eff}$, this effective atomic number having to be the highest possible to allow complete absorption of the X-rays by the material via photoelectric effect for incident energies lower than 100 keV, complete absorption not being possible via Compton effect (arising through the radiation/matter interaction for materials having a low effective atomic number) in which only part of the energy is absorbed in the constituent material of the scintillator. Therefore the X-ray images obtained with materials which, after interaction with incident X photons generate a Compton effect, are of poor quality since the X photons diffusing in the material are not completely absorbed by the material or, if they are absorbed, may be absorbed in such manner that they contribute to obtaining a blurred image.

At the current time, scintillators capable of allowing X-ray absorption via dominant photoelectric effect for incident energies lower than 100 keV are inorganic scintillators such as YAG-type scintillators, more particularly a scintillator of yttrium garnet and caesium doped aluminium type $(Y_3Al_5O_{12}:Ce)$.

On the other hand, the solid organic scintillators conventionally used (typically having an effective atomic number $Z_{eff}$ in the order of 5) do not allow complete absorption of X-rays of energy ranging from 10 to 40 keV, which means that they are little useful for X-imaging.

Regarding light emission, another phenomenon likely to distort X-ray dosimetry is so-called <<Cherenkov>> radiation, characterized by continuous emission intensity, energy loss being proportional to the inverse cube of the wavelength from the ultraviolet to blue-red.

Finally so that they can be efficiently used in the field of X-ray imaging, it is desirable that scintillators should have a rapid mean scintillation decay time due to photon absorption, in particular so as to avoid degradation of X-ray imaging by highly energetic nuclear fusion products (such as fusion neutrons and γ rays, in particular for Megajoule Laser X-ray imaging).

To meet these three conditions (namely, a scintillator having a high effective atomic number, a scintillator emitting fluorescence light of long wavelength and a scintillator advantageously having a short scintillation decay time), inorganic scintillators have been proposed but unconvincingly for X-ray imaging dedicated to Megajoule Laser experiments.

For example:
- inorganic scintillators of YAG type are scarcely efficient having regard to their scintillation decay time that is too long (this decay time ranging from 60 to 100 ns);
- $YI_3$:Ce, $GdI_3$:Ce and $LuI_3$ scintillators, while they deliver substantial fluorescent light under X-ray radiation, they nevertheless also have a long scintillation decay time (from 30 to 40 ns) and emit in the yellow.

Additionally, most of these scintillators are hygroscopic, which limits their field of application, in particular for X-ray imaging.

Faced with the difficulty of finding inorganic scintillators suiting their criteria (namely, capability of absorbing radiation essentially via photoelectric effect and capability of emitting intensely at long wavelengths, such as wavelengths of at least 550 nm), the authors of the present invention have focused on the development of solid organic scintillators meeting the above-mentioned criteria.

DESCRIPTION OF THE INVENTION

The invention therefore relates to a solid organic scintillator comprising a polymeric matrix, in which one or more fluorophores compounds are dispersed together with one or more chemical elements having an atomic number of 40 to 83, characterized in that the said scintillator has a weight content of said chemical element(s) of at least 5% by weight relative to the total weight of the scintillator, and in that the scintillator emits an emission spectrum comprising an emission peak at a wavelength of at least 550 nm and advantageously has a scintillation decay time of less than 20 ns.

With the above-mentioned characteristics, the scintillators conforming to the invention display numerous advantages.

Through the significant presence of chemical element such as defined above translating as a high effective atomic number ($Z_{eff}$) (e.g. at least 30) of the scintillator material, the scintillators of the invention have strong radiation-stopping power, in particular for low energy X-rays (e.g. ranging from 10 to 40 keV). In addition, again on account of the high atomic number ($Z_{eff}$), the energy of the rays arriving on the scintillator (such as X-rays) of energy ranging from 10 to 40 keV is completely absorbed via photoelectric effect, which is of particular interest if the scintillator is intended to be used for X-ray imaging.

Figure 1:
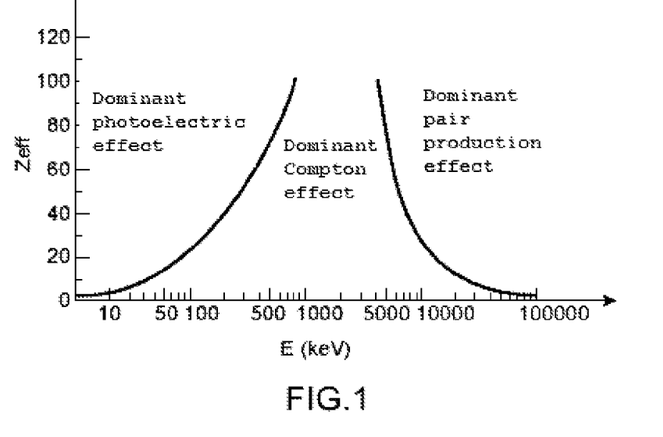
FIG. 1 is a graph illustrating the different absorption mechanisms of radiation having a given incident energy (shown along the X-axis by E and expressed in keV), as a function of the atomic number ($Z_{eff}$) of the absorbing material (shown along the Y-axis by $Z_{eff}$).

Appended FIG. 1 illustrates this phenomenon. This Figure illustrates the three X-ray interaction modes (respectively photoelectric effect, Compton effect and dominant pair production) between X-rays having an incident energy in keV (shown as E along the abscissa) and a material having a given effective atomic number (this atomic number $Z_{eff}$ being shown along the ordinate). It can clearly be seen in this Figure that for a certain range of incident X-ray energy (from 0 to about 800 keV), the higher the effective atomic number ($Z_{eff}$), the greater the probability of incident X-ray absorption via photoelectric effect.

Also, since the scintillators of the invention are capable of emitting an emission spectrum having an emission peak at a wavelength of at least 550 nm (and possibly reaching 620 nm for example), it is possible to overcome a parasitic phenomenon usually encountered with scintillators emitting in the ultraviolet to blue: Cherenkov radiation, likely to distort results when the scintillators are used in the field of X-ray dosimetry.

Further, the scintillators of the invention may have a scintillation decay time of less than 20 ns, preferably from 10 to 15 ns.

As mentioned above, the scintillators of the invention comprise one or more chemical elements whose atomic number Z may range from 40 to 83.

For example, the chemical elements can be chosen from among the elements having an atomic number ranging from 40 to 56 and from 72 to 83.

In particular, the chemical elements can be chosen from among Zr (Z=40), Nb (Z=41), Mo (Z=42), Ru (Z=44), Rh (Z=45), Pd (Z=46), Ag (Z=47), Cd (Z=48), In (Z=49), Sn (Z=50), Te (Z=52), I (Z=53), Cs (Z=55), Ba (Z=56), La (Z=57), Ce (Z=58), Nd (Z=60), Sm (Z=62), Eu (Z=63), Gd (Z=64), Dy (Z=66), Tm (Z=69), Yb (Z=70), Ir (Z=77), Pt (Z=78), Au (Z=79), Tl (Z=81), Pb (Z=82) et Bi (Z=83).

More particularly, the chemical elements able to be included as constituents of scintillators of the invention can be chosen from among Mo, Ag, Cd, In, Sn, I, Ba, Nd, Sm, Gd, Yb, Tl, Pb and Bi.

Preferably, the chemical elements which may be included as constituents of the scintillators of the invention may be lead or tin.

According to the invention, the chemical elements used to form the scintillators of the invention are present in a content of at least 5% relative to the total weight of the scintillator, in particular a content ranging from 10 to 27% by weight relative to the total weight of the scintillator.

Figure 2:
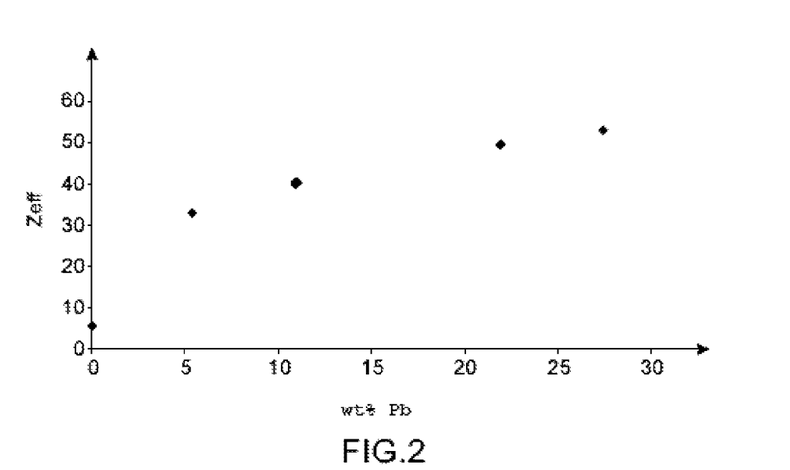
FIG. 2 is a graph illustrating the trend in atomic number ($Z_{eff}$) of a material as a function of the lead weight content T of said material.

When incorporated at a content starting from 5 weight % relative to the total weight of the scintillator, a chemical element such as lead particularly allows a high atomic number ($Z_{eff}$) to be imparted to the material of the scintillator as demonstrated by FIG. 2 which gives a graph of the trend in atomic number ($Z_{eff}$) as a function of the lead weight content (Pb wt %).

The chemical element weight content can be determined by elementary analysis.

According to the invention, the polymeric matrix may comprise one or more (co)polymers, these (co)polymers advantageously imparting transparency properties to the matrix.

In particular, the polymeric matrix may advantageously comprise a (co)polymer comprising repeat units resulting from polymerization of one or more monomers chosen from among styrene, vinyltoluene, vinylxylene, methyl methacrylate, methacrylic acid, 2-hydroxyethyl methacrylate.

More particularly the polymeric matrix, according to a first embodiment, may comprise a copolymer comprising repeat units resulting from polymerization of vinyltoluene and methacrylic acid or, according to a second embodiment, a (co)polymer comprising repeat units resulting from polymerization of 2-hydroxyethyl methacrylate.

The above-mentioned copolymer(s) may be cross-linked copolymers e.g. using a cross-linking agent which may be a monomer comprising at least two polymerizable functions capable, after polymerization, to form a bridge between two copolymer chains. As an example of cross-linking agent, mention can be made of dimethacrylate monomers.

In this case, in addition to the above-mentioned repeat units, the copolymer will comprise repeat units derived from the polymerization of said cross-linking agent.

The scintillator of the invention, as indicated above, comprises one or more fluorophore compounds.

It is specified that by fluorophore compound is meant a chemical compound capable of emitting visible fluorescence light after excitation by photons or other incident particles.

In our case, the fluorophore compound(s) advantageously have the characteristic of being able to absorb photons of wavelengths belonging to the UV region, and of re-emitting photons so that the emission spectrum of these compounds has an emission peak at a wavelength of at least 550 nm, which forms one of the characteristics of the scintillators as mentioned above.

The scintillators of the invention may comprise a first fluorophore compound and a second fluorophore compound.

Advantageously, the scintillators of the invention may comprise a first fluorophore compound capable of absorbing photons and, after this absorption, of emitting photons so that the emission spectrum of the first fluorophore compound has an emission peak at a wavelength of less than 550 nm, and a second fluorophore compound capable of absorbing the photons of wavelengths belonging to said emission spectrum of said first fluorophore compound and, after this absorption, of emitting photons so that the emission spectrum of said second fluorophore compound has an emission peak at a wavelength of at least 550 nm.

A first fluorophore compound able to be incorporated in the scintillators of the invention may meet following formula (I):

where:
- $R^1$ is a mesomeric donor group;
- $R^2$ is a hydrogen atom or mesomeric donor group the same or different from $R^1$;
- $R^3$ is:
  - an acyl group; or
  - a straight-chain or branched, saturated or unsaturated $C_1$ to $C_{20}$ hydrocarbon group, optionally substituted; or
  - a cyclic, saturated $C_3$ to $C_{10}$ hydrocarbon group, optionally substituted; or
  - a saturated $C_3$ to $C_{10}$ heterocyclic group optionally substituted; or
  - an aryl or heteroaryl group, optionally substituted;
- or a salt thereof.

According to the invention, the mesomeric donor group(s) represented by $R^1$ and optionally $R^2$, are preferably chosen from among:
- the —OR' and —SR' groups where R' is a straight-chain or branched, saturated or unsaturated $C_1$ to $C_{20}$ hydrocarbon group, optionally substituted, or a $C_3$ to $C_{10}$ saturated cyclic hydrocarbon group, optionally substituted, or an optionally substituted aryl or heteroaryl group; and
- the —NR'R" groups where R' has the same meaning as previously, whilst R" is either a hydrogen atom, or a straight-chain or branched, saturated or unsaturated $C_1$ to $C_{20}$ hydrocarbon group, optionally substituted, or an optionally substituted cyclic, saturated $C_3$ to $C_{10}$ hydrocarbon group, or an optionally substituted aryl or heteroaryl group.

In the foregoing and in the remainder hereof by <<straight-chain or branched, saturated or unsaturated $C_1$ to $C_{20}$ hydrocarbon group>> is conventionally meant any alkyl, alkenyl or alkynyl group which comprises at least one carbon atom but no more than 20 carbon atoms. Said group may one of the following for example: methyl, ethyl, propyl, isopropyl, butyl, pentyl, neopentyl, hexyl, ethylenyl, propylenyl, butenyl, pentenyl, hexenyl, methylpentenyl, buta-1,3-dienyl, ethynyl, propynyl, butynyl, pentynyl, hexynyl, etc.

By <<cyclic, saturated $C_3$ to $C_{10}$ hydrocarbon group>> is conventionally meant any group which is formed of a cycloalkyl or several fused cycloalkyls and which comprises at least 3 carbon atoms but no more than 10 carbon atoms. Said group may be one of the following for example: cyclopropyl, cyclobutyl, cyclo-pentyl, cyclohexyl, bicyclohexyl, bicyclodecyl, etc.

By <<saturated $C_3$ to $C_{10}$ heterocyclic group>> is conventionally meant a monocyclic or polycyclic group containing one or more heteroatoms and which comprises at least 3 carbon atom but no more than carbon atoms. Said group may be one of the following for example: tetrahydrofuryl, tetrahydro-thiophenyl, pyrrolidinyl, piperidyl, dioxanyl, etc.

By <<aryl group>> is conventionally meant a monocyclic or polycyclic group which meets Hückel's rule, i.e. whose number of delocalized electrons π is equal to 4n+2 (with n=0, 1, 2, 3, . . . ), and by <<heteroaryl group>> is meant a group such as just defined but which comprises one or more heteroatoms. As examples of an aryl group which may be used, mention can be made of the following groups: cyclopentadienyl, phenyl, benzyl, biphenyl, pyrenyl, naphthalenyl, phenantrenyl and anthrakenyl, whilst as examples of heteroaryl groups the following can be cited: furanyl, pyrrolyl, thiophenyl, oxazolyl, pyrazolyle, thiazolyl, imidazolyl, triazolyl, pyridinyl, pyranyl, quinolinyl, pyrazinyl and pyrimidinyl.

Finally, by <<heteroatom>> is conventionally meant any atom other than carbon or hydrogen such as, for example, oxygen, sulphur, nitrogen, phosphorus atoms or a boron atom on the understanding however that the heteroatoms which may be ring members are oxygen, nitrogen or sulphur atoms.

According to the invention, as cyclic, saturated $C_3$ to $C_{10}$ hydrocarbon groups and as saturated $C_3$ to $C_{10}$ heterocyclic groups, preferred use is made of monocyclic groups with 5 or 6 members.

Similarly, as aryl or heteroaryl groups, it is preferred to use monocyclic groups with 5 or 6 members or polycyclic groups not containing more than 3 rings and, further preferably, no more than 2 rings each with 5 or 6 members.

According to the invention, it is preferred to use derivatives meeting general formula (I) in which $R^1$ is a —NR'R" group, where R' and R" have the same meaning as given previously, whilst $R^2$ represents a hydrogen atom.

According to another preferred provision of the invention, $R^3$ represents a relatively voluminous, sterically hindering group so as to limit the phenomenon of auto-quenching. It is therefore preferred that $R^3$ represents a cyclic group, typically an aryl or heteroaryl group substituted one or more times by a branched $C_3$ to $C_6$ alkyl group such as an isopropyl or t-butyl group for example. A cyclic group of this type is the di-t-butylphenyl group for example.

A first specific, particularly advantageous fluorophore compound is a fluorophore meeting following formula (II):

The scintillators of the invention may comprise a proportion of first fluorophore compound ranging from 0.05 to 2% by weight, preferably 1 to 2% by weight relative to the total weight of the scintillator.

The second fluorophore compound of the above-mentioned type may be a compound chosen from among perylene-diimide compounds, oxazone compounds, xanthene compounds, tetraphenylnaphthacene compounds, porphyrin compounds, pyrane compounds, triphenylmethane compounds and mixtures thereof.

Regarding perylene-diimide compounds, mention can be made of compounds which meet following formula (III):

where $R^4$, $R^5$, $R^6$, $R^7$, $R^8$ and $R^9$ independently of each other represent a hydrogen atom, a straight-chain or branched, saturated or unsaturated $C_1$ to $C_{20}$ hydrocarbon group, optionally substituted, an aryl or heteroaryl group optionally substituted.

More particularly, $R^4$ and $R^7$ may represent a cyclic group, typically an aryl or heteroaryl group substituted one or more times by a branched $C_3$ to $C_6$ alkyl group, such as an isopropyl or t-butyl group for example. An example of a cyclic group of this type is the di-t-butylphenyl group and $R^5$, $R^6$, $R^8$ and $R^9$ may represent a hydrogen atom or an alkyl group, for example an alkyl group comprising 1 to 6 carbon atoms.

A specific perylene-diimide compound meeting this definition meets following formula (IV):

(IV)

With regard to oxazone compounds, these may meet following formula (V):

(V)

where $R^{10}$, $R^{11}$, $R^{12}$, $R^{13}$, $R^{14}$, $R^{15}$ and $R^{16}$ independently of each other represent a hydrogen atom, a straight-chain or branched, saturated or unsaturated $C_1$ to $C_{20}$ hydrocarbon group, an —OH group, —NR'R" group, R' and R" being such as defined above or, when positioned on two adjacent carbons, optionally an aromatic cyclic group provided that at least one of these groups represents an —OH group or —NR'R" group.

Specific compounds meeting this definition may meet one of following formulas (VI) and (VII):

(VI)

(VII)

the compound of formula (VI) being known as Nile Red and the compound of formula (VII) being known as resorufine.

In particular, Nile Red is characterized by a molar absorption coefficient ε of 34464 L·mol$^{-1}$·cm$^{-1}$ and a quantum yield in spectroscopic toluene of about 34% at $1.5*10^{-3}$ M and about 53% at $10^{-5}$ M.

Regarding xanthene compounds, these can be more particularly chosen from among rhodamine compounds (such as rhodamine 6G, rhodamine B, rhodamine 123), eosin, fluorescein.

Regarding tetraphenylnaphthacene compounds, particular mention can be made of rubrene (also known as 5,6,11,12-tetraphenylnaphthacene).

Regarding pyrane compounds, 4-(dicyanomethylene)-2-methyl-6-(4-dimethylaminostyryl)-4H-pyran can be cited.

Regarding porphyrins, 5,10,15,20-tetraphenylporphyrin can be cited.

For triphenylmethane compounds, crystal violet can be mentioned (also known as methyl violet 10B).

The scintillators of the invention may comprise a proportion of second fluorophore compound ranging from 0.002 to 1% by weight, preferably 0.05 to 1% by weight relative to the total weight of the scintillator.

Particular scintillators conforming to the invention are scintillators chosen from among:
  scintillators in which:
    the chemical element is lead or tin;
    the polymeric matrix comprises a copolymer comprising repeat units derived from polymerization of vinyltoluene and methacrylic acid;
    the first fluorophore compound is a compound of formula (II) such as explained above and the second fluorophore compound is a compound of formula (IV) such as explained above; and
  scintillators in which:
    the chemical element is lead;
    the polymeric matrix comprises a (co)polymer comprising repeat units derived from polymerization of 2-hydroxyethyl methacrylate;
    the first fluorophore compound is a compound of formula (II) such as explained above and the second fluorophore compound is a compound of formula (IV) such as explained above.

The scintillators of the invention can be characterized by one or more of the following characteristics:
  a capacity of absorbing photons of wavelengths possibly ranging from 350 to 500 nm;
  a capacity of emitting an emission spectrum having an emission peak at a wavelength of at least 550 nm and possibly of up to 620 nm;
  a scintillation decay time possibly ranging from 10 to 15 ns.

From a morphological viewpoint, the scintillators of the invention may assume various forms, which are a function of the mould used. They may therefore be in the shape of cylinders of slabs.

The scintillators of the invention, on account of their polymeric nature, can be prepared using different polymerization techniques allowing the concomitant incorporation of the above-mentioned chemical elements and above-mentioned fluorophore compounds.

In particular, the scintillators of the invention can be prepared using a method comprising the following steps:
- a contacting step to place at least two monomers, of which at least one is complexed with at least one chemical element such as defined above, in contact with at least one fluorophore compound;
- a polymerization step of said monomers, after which the resulting product comprises a polymeric matrix in which said chemical element(s) and said fluorophore compound(s) are trapped.

When the fluorophore compounds comprise at least one unsaturated hydrocarbon group (such as an ethylene group) said fluorophore compounds may directly take part in the polymerization reaction after which, on completion of the polymerization step, they will be covalently bonded to said matrix.

The contacting step and the polymerization step can be conducted in a mould of size allowing the resulting product to have the desired dimensions of the scintillators of the invention.

The monomers can be chosen from among styrene, vinyltoluene, vinylxylene, methyl methacrylate, methacrylic acid, 2-hydroxyethyl methacrylate.

The monomers complexed with at least one chemical element may be monomers comprising at least two polymerizable functions, such as dimethacrylate monomers (e.g. lead dimethacrylate).

The invention will now be described in connection with the Examples given below as non-limiting illustrations.

DETAILED DESCRIPTION OF PARTICULAR EMBODIMENTS

Before going into more detail with the description of these Examples, first an explanation will be given of the protocols for measuring different magnitudes allowing characterization of the present invention, namely the weight content of chemical element (expressed as weight % relative to the total weight of the scintillator), the scintillation decay time (expressed in ns), the X absorption spectrum, the visible emission spectrum.

Protocol for Measuring the Weight Content of Chemical Element

The lead content is determined a priori by calculating the concentration of lead element relative to the other constituent elements of the scintillator (C, H, N, S, O) (this content is called the <<expected content>> in the Tables giving the results of the Examples).

This lead content is then verified a posteriori by performing elementary analysis (this content being called the <<analysed content>> in the Tables giving the results of the Examples). For this purpose, a small portion of scintillator is cut off and ground. It is then analysed using apparatus capable of performing microanalyses.

Protocol for Measuring Scintillation Decay Time

Figure 3:
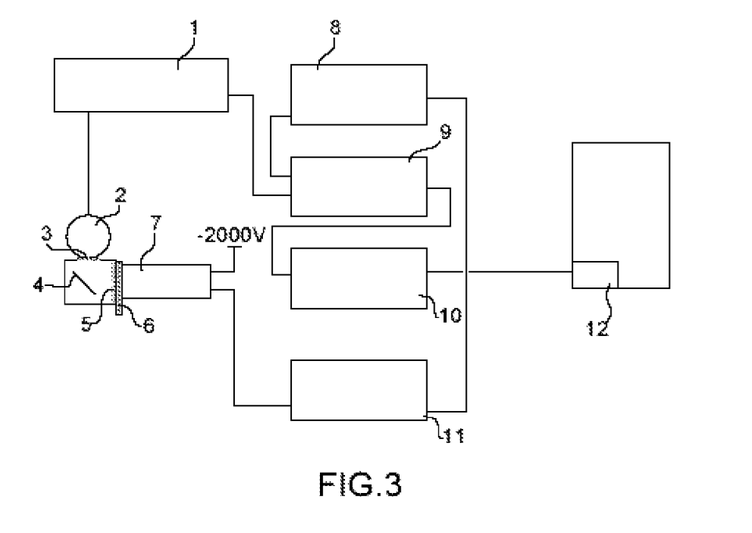
FIG. 3 illustrates a device used to determine the scintillation decay time of the scintillators of the invention.

The scintillation decay time of the scintillators of the invention is measured using a device illustrated in FIG. 3 comprising an electric arc discharge lamp in hydrogen gas 2, driven by a rack 1, a photomultiplier tube 7 and a single-photon counting line (composed of a rate counter 8, a time-amplitude converter 9, a delay box 10 and a pico-timing discriminator 11 and acquisition computer 12).

The lamp 2 generates broad spectrum UV pulses of 1 ns duration, at a frequency of 40 Hz. These UV pulses are optically filtered with a high-pass interference filter 3 for best excitation of the tested scintillator 4 (as a function of a priori knowledge of the excitation spectrum of the solvent). The scintillator is placed in a closed support, insulating it from ambient light. The visible emission of the scintillator is then filtered with a band-pass filter 5 so as to isolate the most intense wavelength of the emission spectrum. An optical density 6 is placed between the scintillator and the photomultiplier tube. The anode of the photomultiplier tube 7 is connected to the pico-second discriminator 11. This discriminator 11 is connected to the rate counter 8. The rate indicated must not be higher than the driving frequency of the lamp 2 i.e. no more than one photon must be seen by the photomultiplier tube 7 per pulse of the lamp 2. If necessary, the intensity detected by the photomultiplier tube 7 is adjusted with the optical density 6. The rate counter 8 is connected to a time-amplitude converter 11, itself connected to the acquisition computer 12 (acting as oscilloscope), in which an acquisition card is housed. Acquisition lasts the time needed for acquiring a signal representing a decrease in light intensity of the scintillator 4 over at least four orders of magnitude. On completion of acquisition, a data file is collected in the form of a histogram associating a number of hits with channels, representing a relative intensity as a function of time. The curve is then analysed by means of a numerical spread-sheet. Starting from the moment of maximum intensity, the curve is adjusted using a decreasing exponential function. The so-called decay time is the time of the decreasing exponential function having the best coefficient of determination.

Protocol for Determining the X Absorption Spectrum

Figure 4:
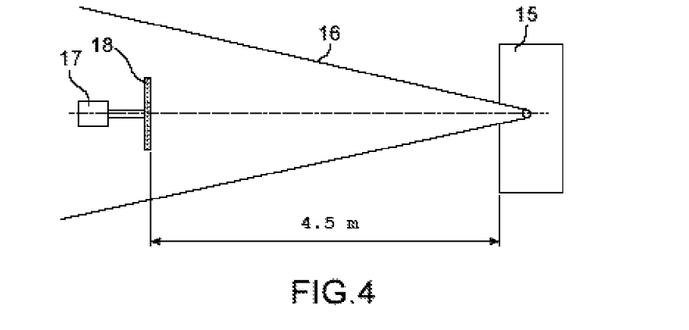
FIG. 4 illustrates a device used to determine the X absorption spectrum of the scintillators of the invention.

The determination of the X absorption spectrum of the scintillators of the invention is carried out using a device illustrated in appended FIG. 4 comprising an X-ray generator 15 and an X-ray detector in cadmium telluride 17 sensitive in the spectral region of 10 to 100 keV.

The detector 17 is positioned 4.5 m away from the X-ray generator 15. The X-ray generator 15 generates an X spectrum derived from braking of electrons on a tungsten anode. The minimum detectable energy in the spectrum is 20 keV. The maximum energy of the X spectrum depends on the control voltage. For example, for a control voltage of 40 kV, the maximum energy contained in the spectrum is 40 keV and so forth for all possible voltages up to 160 kV. Radiation intensity is controlled by the intensity of the current of electrons striking the tungsten anode, and the exposure time of the scintillator 18. The output window of the generator 15 has a diameter size of 30 mm at 10 cm away from the source, which defines the cone 16 limiting the X-ray flow. The detector 17 is placed 4.5 m away from the output window of the generator 15. With this distance it is possible to obtain uniform irradiation of the sensitive surface of the detector 17 which measures 25 mm².

An X spectrum is recorded having parameters of 40 kV, 40 mA and 30 s, without any scintillator placed in front of the detector. This spectrum will be used as reference. This spectrum is pertinent for absorption measurements between 20 and 40 keV. The scintillator 18 is then laid against the radiation detector and the X spectrum is measured which meets the same parameters as recorded without scintillator.

After collecting the histogram delivered by the detector, using a numerical spread-sheet the ratio is calculated between the total energy of the spectrum recorded with the scintillator and the total energy of the spectrum recorded without scintillator. This calculation gives the scintillator's transmission of X-rays for a broad X spectrum. The complement to 1 of this ratio corresponds to the absorption of X-rays by the scintillator.

Protocol for Determining the Visible Emission Spectrum Under X Excitation

Figure 5:
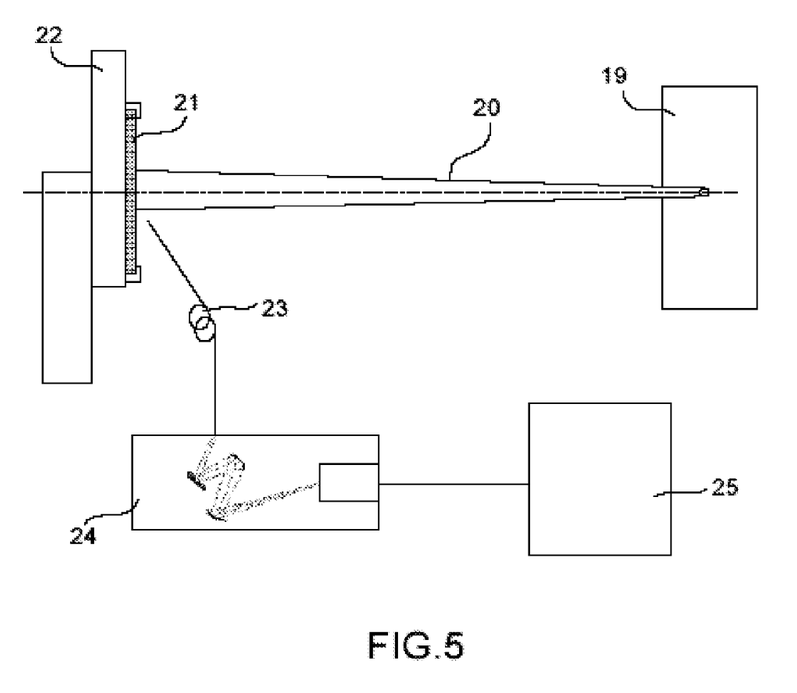
FIG. 5 illustrate a device used to determine the visible emission spectrum under X excitation.

The visible emission spectrum of the scintillators of the invention is determined using a device comprising an X-ray generator tube with tungsten anode 19, a sample holder 22, a collecting optical fibre 23, a monochromator 24 and an acquisition computer 25 illustrated in appended FIG. 5.

The scintillator is placed 21 to 30 cm away from the output shutter of the generator 19. The opening of the shutter is such that the X-ray beam 20 has a square section of 10 mm×10 mm on the surface of the scintillator 21. An optical fibre 23 is placed facing the scintillator 21 at a distance of 1 cm taking care that it does not lie in the axis of X-ray propagation emitted by the tube 21. The monochromator 24 comprises a diffraction grating of 300 lines per millimeter, 500 nm blaze wavelength. The luminescence originating from the scintillator 21 via the optical fibre 23, thus decomposed into its multiple components, is redirected by a set of mirrors onto a CCD camera having a sensitive silicon portion composed of 128 rows and 1024 columns. Each zone of the image reproduced by the CCD camera corresponds to a wavelength. Since the monochromator assembly is driven by computer, the luminescence spectrum of the scintillator 21 is reproduced in graph form showing relative intensity in number of hits along the Y-axis and the wavelength in nanometers along the X-axis.

Example 1

Preparation of a Scintillator Conforming to the Invention

The scintillator conforming to the invention prepared according to this Example comprises a polymeric matrix formed of a poly(vinyltoluene-co-methacrylic acid) copolymer cross-linked with lead dimethacrylate, in which a first fluorophore compound is dispersed: N-(2',5'-di-t-butylphenyl)-4-butylamino-1,8-naphthalimide of following formula (II):

and a second fluorophore compound: (bis-N-(2,5-di-t-butylphenyl)-3,4,9,10-perylenetetracarbodiimide) of following formula (IV):

Initially, preparation of the first fluorophore compound is performed after which the scintillator as such is prepared.

The second fluorophore compound is commercially available.

a) Preparation of N-(2',5'-di-t-butylphenyl)-4-butylamino-1,8-naphthalimide

The title compound is prepared as per the following reaction scheme:

Ac meaning acetyl and NMP meaning N-methylpyrrolidone.
Compounds 1 and 2 are commercially available.

Synthesis of N-(2',5'-di-t-butylphenyl)-4-bromo-1,8-naphthalimide or compound 3

In a 250 mL round-bottomed flask fitted with a water cooler, 2.934 g (10.06 mmol) of compound 1 and 4.131 g (20.12 mmol) of compound 2 are covered with 100 mL of freshly distilled quinoline. Next, 773 mg (3.52 mmol) of dihydrated zinc acetate are added and the reaction mixture is heated under reflux of the solvent for 5 hours. After return to ambient temperature, the mixture is poured into an aqueous solution of pH=1. The aqueous phase is extracted with dichloromethane. The organic phase is dried, filtered and concentrated. The residue is finally chromatographied on silica gel to give 4.583 g of beige solid (Yield: 93%).

Melting point: 214° C. (dec., heptane)

$^1$H NMR (250 MHz, CDCl$_3$) δ ppm: 1.19 (s, 9H, CH$_3$); 1.23 (s, 9H, CH$_3$); 6.91 (d, 1H, J=2.2, H$_6$'); 7.37 (dd, 1H, J=8.7, J=2.2, H$_4$'); 7.48-7.52 (m, 1H, H$_3$'); 7.80 (dd, 1H, J=8.5, J=7.2, H$_6$); 7.99 (d, 1H, J=8.0); 8.38 (d, 1H, J=8.1); 8.55 (dd, 1H, J=8.5, J=1.3); 8.64 (dd, 1H, J=7.2, J=1.3)

$^{13}$C NMR (62.9 MHz) δ ppm: 31.2, 31.7, 34.2, 35.4, 122.6, 123.5, 126.3, 127.6, 128.1, 128.7, 129.4, 130.5, 130.8, 131.1, 131.6, 132.4, 132.5, 133.5, 143.7, 150.1, 164.52, 164.57

Infrared (neat, cm$^{-1}$): 2960, 2873, 1666, 1589, 1496, 1357, 1234.

Synthesis of the Title Compound

In a 10 mL round-bottomed flask, N-(2',5'-di-t-butylphenyl)-4-bromo-1,8-naphthalimide (411 mg, 0.88 mmol) is placed in suspension in N-methylpyrrolidone (abbreviated to NMP). The addition is made of n-butylamine (437 μL, 4.42 mmol) and the reaction mixture is heated to 80° C. for 24 hours. After return to ambient temperature, the reaction mixture is purified by passing through a silica gel column (previously prepared by the addition of powder silica to dichloromethane). After re-crystallization in ethyl ether, the N-(2',5'-di-t-butylphenyl)-4-butylamino-1,8-naphthalimide is isolated in the form of a yellow powder (403 mg, 98%).

The product obtained has a melting point of 233° C. (in diethyl ether).

b) Preparation of the Scintillator as Such

Pure methacrylic acid (3 g, 34.8 mmol), pure vinyltoluene (5 g, 42.3 mmol), lead dimethacrylate (2 g, 5.3 mmol), N-(2',5'-di-t-butylphenyl)-4-butylamino-1,8-naphthalimide (5 mg, 0.011 mmol) and bis-N-(2,5-di-t-butylphenyl)-3,4,9,10-perylenetetracarbodiimide (0.2 mg, 0.26 mmol) are mixed in an inert atmosphere in a dry flask.

The mixture is freed of any gas using the <<freeze-pump-thaw>> method and is then carefully poured into a mould which will impart the final shape to the scintillator. The mixture placed in the mould is subjected to a heat cycle (first at 65° C. for 4 days; secondly at 70° C. for 2 days and thirdly at 100° C. for 1 day). The resulting product is released from the mould and polished until a surface condition is obtained that is optically compatible with imaging applications. It is in the form of an orange-coloured cylinder of diameter 12 mm and height of 4 mm.

The Table below summarizes the weight percentages (expressed relative to the total weight of the mixture) of the ingredients used to prepare this scintillator.

| Ingredients | Weight % |
| --- | --- |
| Vinyltoluene | 50 |
| Methacrylic acid | 30 |
| Lead dimethacrylate | 20 |
| First fluorophore compound | 0.05 |
| Second fluorophore compound | 0.002 |

For the scintillator obtained, the following measurements were made:
- the weight content of lead by elementary analysis;
- measurement of mass density;
- determination of the absorption spectrum obtained using a spectrofluorimeter, observing fluorescence intensity at different excitation wavelengths;
- determination of its emission spectrum by exciting the molecule to maximum excitation then using a spectrofluorimeter to record the fluorescence intensity obtained;
- the scintillation decay time, which is obtained by exciting the scintillator with a UV flash lamp;
- the effective atomic number, determined using XμDAT software from the exact proportion of each element measured by microanalysis.

The results are grouped together in the following Table.

| Magnitude | Results |
| --- | --- |
| Density (in g · cm$^{-3}$) | 1.17 |
| Absorption spectrum (in nm) | 350-500 |
| Maximum peak of the emission spectrum (in nm) | 579 |
| Decay time (in ns ±1 ns) | 13.3 |
| Effective atomic number | 40.3 |
| Lead weight content | Expected: 11% Analysed: 12.3% |

Example 2

Preparation of Another Scintillator Conforming to the Invention

The scintillator conforming to the invention prepared in this Example comprises a polymeric matrix formed of a poly(2-hydroxyethyl methacrylate) polymer cross-linked with lead dimethacrylate, in which are dispersed a first fluorophore compound: N-(2',5'-di-t-butylphenyl)-4-butylamino-1,8-naphthalimide of following formula (II):

and a second fluorophore compound: (bis-N-(2,5-di-t-butylphenyl)-3,4,9,10-perylenetetracarbodiimide) of following formula:

The first fluorophore compound is prepared following the operating protocol described in Example 1.

The second fluorophore compound is commercially available.

The scintillator as such is prepared as per the following operating protocol.

Pure 2-hydroxyethyl methacrylate (5 g, 38.4 mmol), lead dimethacrylate (5 g, 13.2 mmol), N-(2',5'-di-t-butylphenyl)-4-butylamino-1,8-naphthalimide (5 mg, 0.011 mmol) and bis-N-(2,5-di-t-butylphenyl)-3,4,9,10-perylenetetracarbodiimide (0.2 mg, 0.26 μmol) are mixed in an inert atmosphere in a dry flask.

The mixture is freed of any gas using the <<freeze-pump-thaw>> method and carefully poured into a mould which will impart the final shape to the scintillator. The mixture placed in the mould is subjected to a heat cycle (first at 85° C. for 24 hours, secondly at 120° C. for 5 hours and thirdly at 90° C. for 48 hours). The resulting product is released from the mould and polished to obtain a surface condition optically compatible with imaging applications. The scintillator is obtained in the form of an orange-coloured cylinder 42 mm in diameter and 3 mm in height.

The Table below summarizes the weight percentages (expressed relative to the total weight of the mixture) of the ingredients used to prepare this scintillator.

| Ingredients | Weight % |
|---|---|
| 2-hydroxyethyl methacrylate | 50 |
| Lead dimethacrylate | 50 |
| First fluorophore compound | 0.05 |
| Second fluorophore compound | 0.002 |

For the scintillator obtained, the following measurements were determined:
- weight content of lead;
- density measurement by calculating the ratio: scintillator weight/volume;
- determination of the absorption spectrum obtained, using a spectrofluorimeter and observing the fluorescence intensity at different excitation wavelengths;
- determination of its emission spectrum by exciting the molecule to maximum excitation and using a spectrofluorimeter to record the fluorescence intensity obtained;
- the scintillation decay time;
- the effective atomic number determined using XμDAT software from the exact proportion of each element measured by microanalysis.

The results are grouped together in the following Table.

| Magnitude | Results |
|---|---|
| Density (in g · cm$^{-3}$) | 1.55 |
| Absorption spectrum (in nm) | 350-500 |
| Maximum peak of the emission spectrum (in nm) | 591 |
| Decay time (in ns ±1 ns) | 9.2 |
| Effective atomic number | 53.1 |
| Weight content of lead | Expected: 27.4% Analysed: 29.5% |

Example 3

The scintillator conforming to the invention prepared in accordance with this Example comprises a polymeric matrix comprising a poly(vinyltoluene-co-methacrylic acid) copolymer cross-linked with n-dibutyltin dimethacrylate in which are dispersed a first fluorophore compound: N-(2',5'-di-t-butylphenyl)-4-butylamino-1,8-naphthalimide of following formula (II):

and a second fluorophore compound: (bis-N-(2,5-di-t-butylphenyl)-3,4,9,10-perylenetetracarbodiimide) of following formula (IV):

Initially the first fluorophore compound is prepared followed by the preparation of the scintillator as such.

The second fluorophore compound is commercially available.

The scintillator as such is prepared as per the following operating protocol.

Pure methacrylic acid (2.525 g, 29.3 mmol), pure vinyltoluene (2.525 g, 21.4 mmol), n-dibutyltin dimethacrylate (3.367 g, 8.3 mmol), N-(2',5'-di-t-butylphenyl)-4-butylamino-1,8-naphthalimide (4.2 mg, 0.01 mmol) and bis-N-(2,5-di-t-butylphenyl)-3,4,9,10-perylenetetracarbodiimide (0.17 mg, 0.02 µmol) are mixed in an inert atmosphere in a dry flask.

The mixture is freed of any gas using the <<freeze-pump-thaw>> method and carefully poured into a mould which will impart the final shape to the scintillator. The mixture placed in the mould is heated to 85° C. for 13 days. The resulting product is gently returned to ambient temperature, released from the mould and polished to obtain a surface condition optically compatible with imaging applications.

It is in the form of an orange-coloured cylinder 42 mm in diameter and 2.3 mm in height.

Example 4

The scintillator conforming to the invention prepared following this Example comprises a polymeric matrix comprising a poly(vinyltoluene-co-methacrylic acid) copolymer cross-linked with lead dimethacrylate in which are dispersed a first fluorophore compound: N-(2',5'-di-t-butylphenyl)-4-butylamino-1,8-naphthalimide of following formula (II):

(II)

a second fluorophore compound: (bis-N-(2,5-di-t-butylphenyl)-3,4,9,10-perylenetetracarbodiimide) of following formula (IV):

(IV)

and a third fluorophore compound: 2,5-diphenyloxazole.

The scintillator as such is prepared as per the following operating protocol.

Pure methacrylic acid (5.38 g, 62.5 mmol), pure vinyltoluene (8.93 g, 75.6 mmol), lead dimethacrylate (3.584 g, 9.5 mmol), N-(2',5'-di-t-butylphenyl)-4-butylamino-1,8-naphthalimide (17.9 mg, 0.040 mmol), bis-N-(2,5-di-t-butylphenyl)-3,4,9,10-perylenetetracarbodiimide (1.8 mg, 2.35 µmol) and 2,5-diphenyloxazole (358 mg, 1.62 mmol) are mixed in an inert atmosphere in a dry flask.

The mixture is freed of any gas using the <<freeze-pump-thaw>> method and carefully poured into a mould which will impart the final shape to the scintillator. The mixture placed in the mould is heated to 65° C. for 4 days. The resulting product is gently returned to ambient temperature, released from the mould and polished to obtain a surface condition optically compatible with imaging applications.

It is in the form of an orange-coloured cylinder of diameter 47 mm and height of 4.8 mm.

The invention claimed is:

1. A solid organic scintillator comprising a polymeric matrix in which are dispersed a first fluorophore compound and a second fluorophore compound and one or more metal methacrylics wherein the metal is selected from the group consisting of Pb and Sn,
   wherein said scintillator has a weight content of said chemical elements of at least 5% by weight relative to the total weight of the scintillator, and
   wherein the scintillator emits an emission spectrum comprising an emission peak at a wavelength of at least 550 nm and has a scintillation decay time of less than 20 ns,
   wherein the first fluorophore compound is according to formula (I):

(I)

wherein:
$R^1$ is a mesomeric donor group;
$R^2$ is a hydrogen atom or mesomeric donor group the same or different from $R^1$;
$R^3$ is:
   an acyl group; or
   a straight-chain or branched, saturated or unsaturated $C_1$ to $C_{20}$ hydrocarbon group, optionally substituted, or
   a cyclic saturated $C_3$ to $C_{10}$ hydrocarbon group, optionally substituted; or
   a saturated $C_3$ to $C_{10}$ heterocyclic group, optionally substituted; or
   an aryl or heteroaryl group, optionally substituted;
or one of the salts thereof; and
   wherein the second fluorophore compound is a perylenediimide compound according to formula (III):

(III)

wherein $R^4$, $R^5$, $R^6$, $R^7$, $R^8$ and $R^9$ independently of each other represent a hydrogen atom, an optionally substituted straight-chain or branched, saturated or unsaturated $C_1$ to $C_{20}$ hydrocarbon group, or an optionally substituted aryl or heteroaryl group.

2. The scintillator according to claim 1 wherein the content of the metal methacrylics ranges from 10 to 27% by weight to the total weight of the scintillator.

3. The scintillator according to claim 1 wherein the metal is lead.

4. The scintillator according to claim 1 wherein the polymeric matrix comprises a (co)polymer comprising repeat units resulting from the polymerization of one or more monomers chosen from among styrene, vinyltoluene, vinylxylene, methyl methacrylate, methacrylic acid, and 2-hydroxyethyl methacrylate.

5. The scintillator according to claim 4 wherein the (co)polymer is cross-linked.

6. The scintillator according to claim 1 wherein the polymeric matrix comprises a (co)polymer comprising repeat units resulting from the polymerization of vinyltoluene and methacrylic acid.

7. The scintillator according to claim 1 wherein the polymeric matrix comprises a (co)polymer comprising repeat units resulting from the polymerization of 2-hydroxyethyl methacrylate.

8. The scintillator according to claim 1 wherein the first fluorophore compound is capable of absorbing photons and, after this absorption, of emitting photons so that the emission spectrum of said first fluorophore compound has an emission peak at a wavelength of less than 550 nm, and the second fluorophore compound is capable of absorbing the photons of wavelengths belonging to said emission spectrum of said first fluorophore compound and, after this absorption, of emitting photons so that the emission spectrum of said second fluorophore compound has an emission peak at a wavelength of at least 550 nm.

9. The scintillator according to claim 1 wherein the mesomeric donor group(s) represented by $R^1$ and optionally $R^2$ are chosen from among:
   —OR' and —SR' groups where R' represents a straight-chain or branched, saturated or unsaturated $C_1$ to $C_{20}$ hydrocarbon group, optionally substituted, or a cyclic saturated $C_3$ to $C_{10}$ hydrocarbon group, optionally substituted, or an aryl or heteroaryl group optionally substituted; and
   —NR'R" groups where R' has the same meaning as given above, and R" represents either a hydrogen atom, or a straight-chain or branched, saturated or unsaturated $C_1$ to $C_{20}$ hydrocarbon group, optionally substituted, or a cyclic saturated $C_3$ to $C_{10}$ hydrocarbon group, optionally substituted, or an aryl or heteroaryl group optionally substituted.

10. The scintillator according to claim 1 wherein $R^1$ represents a —NR'R" group, where R' represents a straight-chain or branched, saturated or unsaturated $C_1$ to $C_{20}$ hydrocarbon group, optionally substituted, or a cyclic saturated $C_3$ to $C_{10}$ hydrocarbon group, optionally substituted, or an aryl or heteroaryl group optionally substituted, and R" represents either a hydrogen atom, or a straight-chain or branched, saturated or unsaturated, $C_1$ to $C_{20}$ hydrocarbon group, optionally substituted, or a cyclic saturated $C_3$ to $C_{10}$ hydrocarbon group, optionally substituted, or an aryl or heteroaryl group optionally substituted.

11. The scintillator according to claim 1 wherein $R^3$ represents a cyclic group, substituted one or more times by a branched $C_3$ to $C_6$ alkyl group.

12. The scintillator according to claim 11, wherein the cyclic group is an aryl or heteroaryl group.

13. The scintillator according to claim 1 wherein the first fluorophore compound is according to formula (II):

14. The scintillator according to claim 1 wherein the content of the first fluorophore ranges from 0.05 to 2% by weight relative to the total weight of the scintillator.

15. The scintillator according to claim 1 wherein $R^4$ and $R^7$ represent an aryl or heteroaryl group, substituted one or more times by a branched $C_3$ to $C_6$ alkyl group.

16. The scintillator according to claim 15, wherein $R^4$ and $R^7$ represent an aryl group, substituted one or more times by a branched $C_3$ to $C_6$ alkyl group.

17. The scintillator according to claim 1 wherein the second fluorophore compound is according to formula (IV):

18. The scintillator according to claim 1 wherein the content of the second fluorophore compound ranges from 0.002 to 1% by weight relative to the total weight of the scintillator.

19. The scintillator according to claim 1, chosen from among:
   the scintillators in which:
   the metal is lead or tin;
   the polymeric matrix comprises a (co)polymer comprising repeat units derived from polymerization of vinyltoluene and methacrylic acid;
   the first fluorophore compound is a compound of formula (II)

and the second fluorophore compound is a compound of formula (IV)

(IV)

and the scintillators in which:
the metal is lead;
the polymeric matrix comprises a (co)polymer comprising repeat units derived from the polymerization of 2-hydroxyethyl methacrylate;
the first fluorophore compound is a compound of formula (II)

(II)

and the second fluorophore compound is a compound of formula (IV)

(IV)

* * * * *

UNITED STATES PATENT AND TRADEMARK OFFICE
CERTIFICATE OF CORRECTION

PATENT NO.         : 9,499,738 B2
APPLICATION NO.    : 13/992977
DATED              : November 22, 2016
INVENTOR(S)        : Matthieu Hamel It is certified that error appears in the above-identified patent and that said Letters Patent is hereby corrected as shown below:

In the Specification

Column 5, Line 51: "no more than carbon atoms." should be --no more than 10 carbon atoms.--.

Signed and Sealed this
Third Day of January, 2017

Michelle K. Lee
*Director of the United States Patent and Trademark Office*